United States Patent
Davis

(12)
(10) Patent No.: US 6,438,516 B1
(45) Date of Patent: Aug. 20, 2002

(54) METHOD AND APPARATUS FOR OPTIMIZING UNICODE COMPOSITION AND DECOMPOSITION

(75) Inventor: Mark E. Davis, Menlo Park, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/206,544

(22) Filed: Dec. 7, 1998

(51) Int. Cl.[7] .............................. G06F 17/20; G06F 7/00
(52) U.S. Cl. ........................................ 704/8; 345/467
(58) Field of Search ...................... 704/1, 8; 707/530, 707/535, 536; 345/467; 708/203

(56) References Cited

U.S. PATENT DOCUMENTS

| | | | | |
|---|---|---|---|---|
| 5,758,314 A | * | 5/1998 | McKenna ........................ | 704/8 |
| 5,784,069 A | * | 7/1998 | Daniels et al. .................. | 704/8 |
| 5,784,071 A | * | 7/1998 | Tang et al. ...................... | 345/467 |
| 5,787,452 A | * | 7/1998 | McKenna ........................ | 707/536 |
| 5,793,381 A | * | 8/1998 | Edberg et al. ................... | 345/467 |
| 5,889,481 A | * | 3/1999 | Okada ............................. | 351/51 |
| 6,070,179 A | * | 5/2000 | Craft ............................... | 708/203 |

\* cited by examiner

*Primary Examiner*—Patrick N. Edouard
(74) *Attorney, Agent, or Firm*—Kudirka & Jobse, LLP

(57) ABSTRACT

A method and apparatus for performing compositions and decompositions of Unicode combined character sequences utilizes a preprocessor to generate compositions and decompositions of Unicode character sequences and a mapping table generates a plurality of tables use to access the tables. A decomposition mapping table, created from a Unicode database and rules, maps precomposed Unicode characters to their respective decompositions. A composition mapping table, derived from the decomposition mapping table, includes canonical equivalent combined character sequences of the mapped decompositions. Additionally, a normalized mapping table, created from the composition mapping table, maps valid combined character sequences consisting of the same characters, wherein one of the sequences is defined as a normalized form. The mapping tables are accessed by a runtime processor when a system entity requests a decomposition or composition of Unicode characters to provide the appropriate decomposition or composition.

4 Claims, 9 Drawing Sheets

| E1 + E2 | C |
|---|---|
| A - TILDE - ACUTE + DOT_BELOW | Â'. |
| A - TILDE - DOT_BELOW + ACUTE | Â'. |
| A - DOT_BELOW - TILDE +ACUTE | Â'. |

*FIG. 7*

METHOD AND APPARATUS FOR OPTIMIZING UNICODE COMPOSITION AND DECOMPOSITION

FIELD OF THE INVENTION

The invention relates, in general, to methods and systems used for the computer processing of text, and more specifically, to the composing and decomposing of text represented according to the Unicode Standard in a computer system.

BACKGROUND OF THE INVENTION

Computer systems required to process text information, may use an international standard for international coding text. The accepted standard for international coded text information is called the Unicode® Standard published by Unicode, Inc. According to the Unicode Standard, "text" refers to alphabetic characters as well as punctuation marks, diacritics, mathematical symbols, technical symbols, arrows, etc. The Unicode Standard, Version 2.0 and subsequent versions and revisions thereto, provides the In capacity to encode all the characters used for the major written languages of the world and is incorporated herein by reference. For example, Unicode scripts include Latin, Greek, Armenian, Hebrew, Arabic, Bengali, Thai, Japanese kana, a unified set of Chinese, Japanese, and Korean ideographs, as well as many other languages. The Unicode Standard provides codes for nearly 39,000 characters from the world's alphabets, symbol collections, and ideograph sets. Left unused for future expansion are 18,000 codes, while over 6,000 codes are reserved for private use. The private use codes are intended to be system or application specific and can be defined by those developing their own system or application.

The Unicode Standard is based on a 16 bit code set that provides codes for more than 65,000 characters, whereby each character is identified by a unique 16 bit value. In fact, there are 65,536, i.e. 2 to the eighth power, possible values inherent in a 16 bit word. The code values of the Unicode Standard are equivalent to the code values of the "Universal Character Set" in two-octet form (UCS-2), which is a subset of ISO/IEC 10646. ISO 10646's full code set is called Universal Character Set in four octet form (UCS-4). Unicode does not use complex modes or escape codes for constructing or representing characters and thus is a simplified and straightforward approach to representing characters.

The Unicode Standard is based on three underlying premises. The first premise is that the standard must define the smallest useful elements of text being coded. The second premise is that a unique character code must be assigned to each element. Finally, the third premise is that basic rules for encoding and interpreting text must be provided so that programs can successfully read and process the coded text. When defining elements of text for a given language, it must be determined what the smallest textual elements of the language are which are used to create words and sentences. For example, the smallest textual elements would be single graphical elements in many languages. But in other languages, the smallest textual elements may be multiple graphical elements, such as in Devanagari.

Regardless of the language, the smallest textual elements are represented in Unicode as "code elements". Code elements serve as the building blocks for Unicode "characters", wherein a Unicode "character" may be an element itself, e.g. "u", a combination of text elements, e.g., "u", or, to a much lesser extent, a symbol, e.g. "*". For the most part, code elements correspond to the most commonly used text elements. For example, each upper case and lower case letter in the English alphabet is represented by a single code element. As a result, coding of elements under the Unicode Standard remains straightforward with a single value for each element. Where appropriate, the Unicode Standard also defines codes for the presentation of text. For instance, some codes control the direction in which text is written whether left to right or right to left and in rare cases where text must change directions within a single run of script. Also, the Unicode Standard defines explicit characters for line and paragraph endings, but the large majority of codes represent text or code elements.

Typically, interpretation of text by a computer system is accomplished as the text is being processed. For example, consider the case where a user is typing on a computer system using a word processor application. When the computer operator depresses a key or key combination, for example "shift and d", the computer system receives a signal or message that the "shift" and "d" keys were simultaneously pressed at the keyboard. This message is encoded by the computer system as a Unicode Standard code. An application, e.g., a word processor, stores the code in memory and also passes it on to the display software for rendering the character on the screen. The display software processes the code and displays the letter "D",; this process continues as typing continues.

While, the Unicode Standard directly addresses encoding and interpreting of text for presentation, it does not address many other actions performed on the text related to presentation or the application itself. For example, the standard does not address issues such as spell checking, that is left to applications. Furthermore, the Unicode Standard does not address the rendering of characters on the screen, such as font and size. The representation or rendering of the character on the screen is called a "glyph". The Unicode Standard does not define glyphs, rather it limits itself to the code value associated with an abstract character entity, such as Latin character "b". It is actually the software or hardware rendering engine of the computer or application program which is responsible for the appearance of the characters on the screen.

In addition, the Unicode Standard does address encoding of "composed character sequences" (CCS). CCS refers to the representation of multiple characters rendered together. For example, "â" is a composed character created by rendering an "a" and "^" together. According to the standard, a CCS is made up of a base character first, occupying a single space, and is followed by one or more non-spacing marks to be rendered in the same space as the base character or a spacing mark to be rendered adjacent to the base character. For often used CCSs, the Unicode Standard defines a single code value to represent the common combination of characters, rather than combining a base character with a combination of other individual characters each time the common CCS is used. These are referred to as "pre-composed" characters. For example, the character "ü" can be encoded as the single code value U+00FC or as two values where the base character U+0075 represents "u" followed by the non-spacing character U+0308 which represents "", expressed as "u+".

Decomposition of pre-composed characters is also defined by the Unicode Standard. For example, a word processor importing a text file containing a pre-composed character may decompose the character into its base character and subsequent non-spacing characters if, for some reason, this makes processing within the word processor easier or more efficient. A pre-composed character is simply a special type of CCS, whereby the pre-composed character is represented by a single predefined Unicode value.

The Unicode Standard specifies an algorithm for determining whether CCSs of Unicode are "equivalent". The Unicode concept of equivalence facilitates the interchanging of pre-composed characters with decomposed versions of the same characters and vice versa. Pre-composed characters and character sequences are equivalent if, when fully decomposed and correctly ordered, yield identical elements in identical sequences. The Unicode Standard algorithm decomposes pre-composed characters then orders them according to the Unicode rules based, in part, on each character's combining class. Elements which combine with other elements are referred to as "combining characters" and have associated with them a "combining class". The combining class is a Unicode Standard construct whereby characters are classified based on a precedence which relates to how characters can be combined. As discussed earlier, whether a combining character is spacing or non-spacing relates to how it combines with other characters.

Within the process of decomposing a character sequence, Unicode employs a Canonical Ordering Algorithm, which aids in the performance of equivalence comparisons by determining which characters interact "typographically". Characters interact typographically if their order plays a role in the ultimate positioning of the characters within a sequence. For example, if non-spacing characters within a sequence do not typographically interact, then they are treated as equivalents. In practice, each Unicode combining character is assigned a numerical value indicating other combining characters with which the combining Unicode character typographically interacts. Characters of the same combining class typographically interact, whereas characters of different combining classes do not. The final result of the decomposition process is that the original pre-composed character has been transformed into what is referred to a its decomposed "normalized form". Typically, the normalized form starts with a base character which is followed by non-spacing combining marks which are ordered within the sequence based on increasing combining class values from left to right.

Examples in this specification may use a "+" to indicate a sequence of characters. For example, "â" decomposed would be represented as "a+^", where "a" is the base character, "+" represents that it is a sequence of characters, and "^" is a non-spacing combining mark, i.e., it occupies the same space as the letter "a".

From the normalized form, a CCS can also be composed, in accordance with the Unicode Standard, into a pre-composed character, represented by a single Unicode value, assuming that Unicode defines a character for the particular CCS combination.

Representing a CCS or pre-composed character in its decomposed normalized form allows comparisons to determine equivalence among two representations of similar character sequences. A determination of equivalence allows substitutions by a system or application as required by that system or application. Under the current Unicode Standard, and algorithms therein, the process of getting character sequences into normalized forms and ultimately performing comparisons to determine equivalence is often quite time consuming. Also, such process is accomplished as the characters are being requested, during runtime. Therefore, the process diverts valuable processor resources from the application being used. For example, a CCS is first broken down into all of its low level characters through a series of searches and sorts spanning, potentially, the entire Unicode database of more than 65,000 characters. Once all the characters are determined, only then can the string of characters be put into a normalized form, again by a series of sorts based on combining class values. Following normalization of each CCS under comparison, a determination of equivalence can be made.

Composing a character in accordance with the current Unicode algorithms also involves fully decomposing a character string as described above, placing it into normalized form, and then iteratively combining characters according to combining class values. It should be noted that because different non-spacing combining marks within a string can have the same combining class value, there may exist multiple valid normalized forms for a set of characters or a pre-composed character. This fact can make comparison of even normalized forms of CCSs complex and time consuming.

Accordingly, a need exists for a method and apparatus for efficiently decomposing and composing Unicode characters.

SUMMARY OF THE INVENTION

The present invention comprises apparatus and methods for efficiently decomposing and composing Unicode characters. A pre-processor accesses a known database of Unicode characters to create decomposition and composition mapping tables. The decomposition mapping table (M) comprises decomposition data for existing Unicode pre-composed characters. Two composition mapping tables are created, one for standard compositions, called the composition mapping table (MT), and one which is used to resolve ambiguous compositions, called a composition "normalized" mapping table (NMT). Ambiguous compositions occur when combining characters can be validly ordered in more than one sequence. The composition mapping table MT is derived from the decomposition mapping table M and comprises canonically equivalent CCSs for each decomposition therein. The normalized mapping table NMT is derived from the composition mapping table MT and comprises pairs of equivalent CCSs, wherein, although both CCSs are valid, one of the pair is defined as the normalized CCS. In the illustrative embodiment, the mapping tables are created only once and then stored in memory for subsequent use by the system or applications.

The decomposition mapping table (M) is created under the control of a pre-processor. A search engine within the pre-processor obtains each pre-composed character (C) and its corresponding decomposition (D) from the Unicode Standard DB. The pre-composed character C and its associated decomposition D are referred to as the decomposition "key value pair" <C,D>, which is written into mapping table M. The search engine then analyzes the sub-characters in each D to determine whether D can be further decomposed. Specifically, the search engine determines whether there is a decomposition in mapping table M for each sub-character in a given D. If sub-characters do have decompositions, then they are replaced within D with the decomposition and ultimately sorted using Unicode's combining class rules to create a D'. Consequently, a new key pair value <C,D'> is created, which the writer stores in mapping table M in place of <C,D>. This process continues until all pre-composed Unicode characters are mapped into the decomposition mapping table with a maximally decomposed character sequence. Characters which do not have decompositions are not processed or added to M.

With the decomposition mapping table M created, an application, for example, may request a decomposition of a source CCS string. In this case, a runtime processor controls the determination of a decomposition for the given source CCS string. Each character (C) within the source CCS is analyzed and decomposed to create a "result string", which stores the decomposition as it is being created. If a character C has a decomposition D in M, then D is appended in the result string. However, if C is a combining mark, it is appended to the result string and the result string is then sorted and ordered based on the Unicode combining class rules. Alternatively, if C does not have a decomposition D and is not a combining mark, C is simply appended to the result string. Because the result string is ordered as it is being created, the final result is a normalized fully decomposed version of the original source CCS string. The resulting decomposition is passed back to the application which requested it by the runtime processor and the memory associated with the result string is cleared.

The composition mapping table (MT) is also created using the pre-processor. The search engine of the pre-processor iterates through each Unicode character C in the decomposition mapping table M, and if the decomposition D associated with C has a base character as its first character, the search engine obtains D. Keeping the base character as the first character, a combiner within the pre-processor sorts the remaining characters within the decomposition into all possible combinations. This process produces a set (S) of all possible combinations of decompositions which could be associated with C, wherein each combination within the set is referred to as an "element" (E). The pre-processor uses the Unicode combining class rules to determine whether each element is canonically equivalent to C, and discards those elements which are not. The pre-processor continues operating on the remaining elements. If an element includes only two sub-elements or characters, a composition "key value pair", i.e., <E, C>, is written into the composition mapping table MT. The composition key value pair includes the original character C and exactly two sub-elements, where $E=E_1+E_2$, in the illustrative embodiment. If an element is comprised of more than two sub-elements, all of the sub-elements are grouped into an element $E'_1$, with the exception of the right-most sub-element $E_x$. The search engine determines whether a composed character $C_1$ exists in mapping table M which corresponds to $E'_1$. If a $C_1$ does exist in M, then the group of sub-elements represented by $E'_1$ is replaced with $C_1$. Accordingly, a key value pair of $<C_1+E_x, C>$, results and is written to MT. If a $C_1$ does not exist in M for $E_1$, then that element E is discarded. Because sub-elements may have the same combining class values, they may be combined in different orders and still be canonically equivalent. Consequently, for each C, there may be multiple valid E's, thus multiple composition key value pairs for the same C within MT.

The pre-processor then creates the NMT by determining whether or not there are ambiguous compositions in the MT. Typically, an ambiguous composition involves at least three characters: a base character B1, a combining character C1, and another combining character C2. When B1–C1+C2 and B1–C2+C1 are both valid compositions, the order in which C1 and C2 should be combined by the pre-processor with base character B1 is ambiguous. Since both forms are valid, one of the two forms is defined as the "normalized" composition. The NMT provides a mapping of B1–C1+C2 to B1–C2+C1, so that in all instances the normalized composition gets provided to the runtime processor when a composition is created. The pre-processor tests each key value pair, e.g., <E1+E2, C>, in the MT with each combining character, e.g., C', having a combining class which is not equal to the combining class of E2. If E1–E2+C' and E1–C'+E2 are both valid, the two are entered into the NMT together.

With the composition mapping tables MT and NMT created, an application, for example, may request a composition of a source decomposed character string, which is comprised of a plurality of characters, Cs. In this case, the runtime processor iterates through each C to build a "result string". As the result string is being constructed, the runtime processor uses the mapping tables MT and NMT to determine whether Cs within the result string can be combined. If so, the runtime processor replaces those Cs with the valid composition from the MT or NMT. Specifically, if C is a base character, it is added to the result string R and its position (p) within the result string R is stored, wherein C can then be denoted by R(p). However, if C is a combining mark, and p is set, the runtime processor determines whether there exists a composition for R(p)+C in MT, denoted as CM. If no other character within the result string after R(p) has the same combining class value as C, then R(p)+C is replaced with $C_{MT}$. Alternatively, if p is set and if R(p)+C has a mapping in $C_{NMT}$=B1+C1 in mapping table NMT, then the runtime processor scans the characters after R(p). If none of the characters have the same combining class value as C or C1, then R(p) is replaced with B1 and C2 is appended to the end of result string R. If p is not set or there is no CMT for R(p)+C, then the combining mark C is appended to the result string and the string is sorted using the Unicode combining class rules. In the case where C is a composite combining mark, C is decomposed into its characters and each character is then analyzed in the same manner as the original characters C get analyzed. Otherwise, C is simply appended to the result string and the runtime processor continues iterating through the remaining Cs. As this process is repeated, Cs are combined in accordance with the entries in the mapping table MT and NMT to produce a CCS which is composed, to the maximum extent possible, and is still the canonical equivalent of the original source decomposed character string. The runtime processor returns the CCS to the application, clears the result string, and unsets p.

According to one aspect of the invention, in a computer system capable of storing and processing data and having access to a Unicode database comprising predefined Unicode characters and predefined Unicode rules for decomposition of Unicode combined character sequences, a method for generating a canonical equivalent Unicode composition or decomposition from a Unicode source combined character sequence string upon request, comprising the steps of: A) reading a mapping table database from a plurality of Unicode source combined character sequence strings; B) receiving from a requesting entity a request for either of a Unicode composition or decomposition given one of the source combined character sequence strings as part of the request transmission; C) retrieving from the mapping table database the requested composition or decomposition based on the source combined character sequence string provided with the request; and D) providing the located and requested composition or decomposition to the requesting entity.

According to a second aspect of the invention, an apparatus for deriving canonical equivalent Unicode compositions from Unicode source combined character sequences comprises a pre-processor and capable of generating i) a Unicode canonical equivalent composition or decomposition from a Unicode source combined character sequence, and ii) data defining a logical association between the source combined character sequence and the canonical equivalent compositions or decomposition; and map table generator coupled to the pre-processor and capable of storing the canonical equivalent Unicode compositions and decompositions received from the pre-processor, the Unicode source combined character sequence, and data defining a logical association between the Unicode source combined character sequence and the canonical equivalent Unicode compositions and decompositions derived therefrom.

According to a third aspect of the invention, a computer program product for use with a computer system having access to a Unicode database of predefined Unicode characters and predefined Unicode rules for decomposition of Unicode combined character sequences, the computer program product comprising a computer useable medium having program code embodied in the medium and configured to produce the canonical equivalent Unicode compositions from a Unicode source combined character sequence string, the program code comprising pre-processor program code capable of generating i) a Unicode canonical equivalent composition or decompositions from a Unicode source combined character sequence and ii) data defining a logical association between the source combined character sequence and the canonical equivalent composition and decompositions; and map table generator program code responsive to the pre-processor program code and capable of storing the canonical equivalent Unicode compositions and decompositions received from the pre-processor program code, the Unicode source combined character sequence, and data defining a logical association between the Unicode source combined character sequence and the canonical equivalent Unicode composition and decompositions derived therefrom.

BRIEF DESCRIPTION OF THE DRAWINGS

The above and further advantages of the invention may be better understood by referring to the following description in conjunction with the accompanying drawing in which:

FIG. 7 is a notional composition mapping table in accordance with the illustrative embodiment;

DESCRIPTION OF THE ILLUSTRATIVE EMBODIMENT

The present invention includes a method and apparatus for decomposing and composing Unicode combined character sequences (CCSS) in an efficient manner. The computer's processor is relieved of having to sort through and run comparisons on, potentially, the full Unicode DB each time a source string is sought to be composed or decomposed. A source CCS string may be composed of a series of pre-composed characters, decomposed characters, or a combination of the two.

Figure 1:
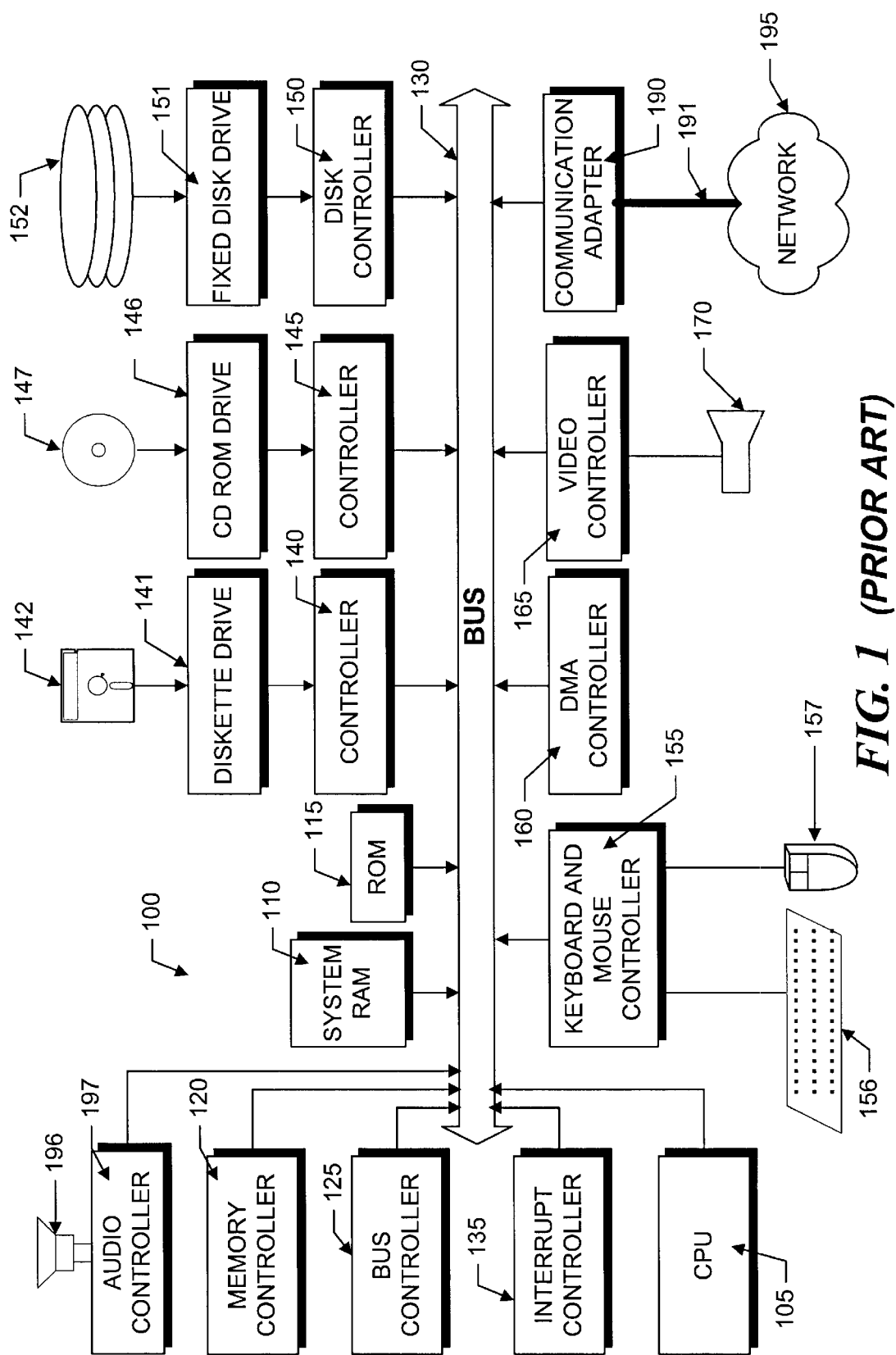
FIG. 1 illustrates prior art computer architecture suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among other things.

The inventive apparatus may be implemented as a combination of hardware and software. While the software could be written in either a procedural language or OOD language, it is preferred that it be written in an object oriented language, e.g. Java, which lends itself to component reuse and easier maintainability. For purposes of clarity and completeness a brief review of object oriented programming is provided. Object Oriented Programming techniques involve the definition, creation, use and destruction of "objects". These objects are software entities comprising data elements, or attributes, and methods, or functions, which manipulate the data elements. The attributes and related methods are treated by the software as an entity and can be created, used and destroyed as if they were a single item. Together, the attributes and methods enable objects to model virtually any real-world entity in terms of the entity's characteristics, represented by the data elements, and the entity's behavior, represented by data manipulation functions or methods. In this way, objects can model concrete things like people and computers, and they can also model abstract concepts like numbers or geometrical designs. Objects are defined by creating "classes" which are not objects themselves, but which act as templates that instruct the compiler how to construct the actual object. A class may, for example, specify the number and type of data variables and the steps involved in the methods which manipulate the object's data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise, objects are destroyed by a special function called a destructor. Objects may be used by using their data and invoking their methods. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal methods. More particularly, during program design, a program developer can define objects in which all or some of the attributes and all or some of the related methods are considered "private" or for use only by the object itself. Other data or methods can be declared "public" or available for use by other programs. Access to the private variables by other programs can be controlled by defining public methods for an object which access the object's private data. The public methods form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes, and the objects which are later created from them, as related. Specifically, classes may be designated as subclasses of other base classes. A subclass "inherits" and has access to all of the public functions of its base classes just as if these functions appeared in the subclass. Alternatively, a subclass can override some or all of its inherited methods or may modify some or all of its inherited methods merely by defining a new method with the same form. Overriding or modification does not alter the method in the base class, but merely modifies the use of the method in the subclass. The creation of a new subclass which has some of the functionality, with selective modification, of another class allows software developers to easily customize existing code to meet their particular needs.

Figure 2:
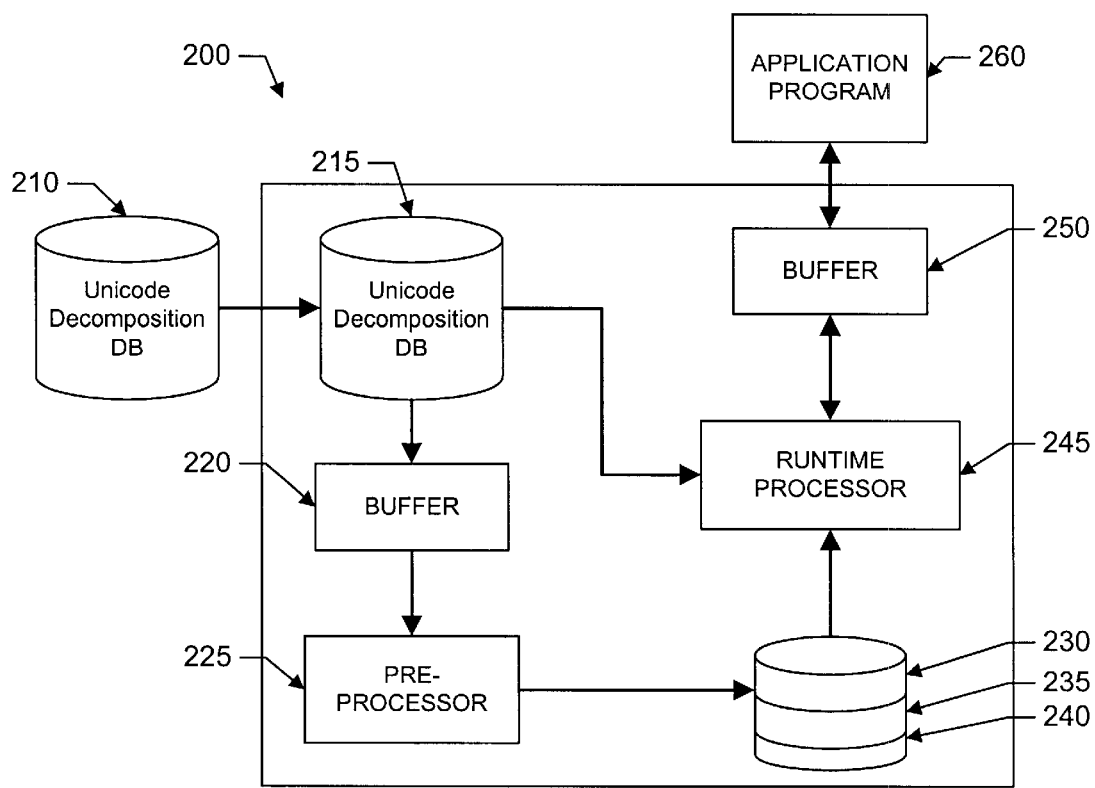
FIG. 2 is a conceptual block diagram depicting the decomposition and composition apparatus of the illustrative embodiment.

Referring to FIG. 2, the apparatus of the illustrative embodiment is shown. The Unicode decomposition database 210, which is publicly available, is read into local memory 215, e.g., hard drive or disk. Having the Unicode DB 210 local to the system allows the system to run more efficiently. Buffer 220 acts as temporary storage for Unicode data on which the pre-processor 225 is operating. The pre-processor 225 operates in one of two modes, either decomposition or composition, to create mapping tables 230, 235, 240. The pre-processor 225 uses the Unicode DB 210 to create a decomposition mapping table (M) 230, wherein decompositions are created for each existing Unicode pre-composed character. Once mapping table M 230 is created, the pre-processor 225 uses mapping table M 230 to create a composition mapping table (MT) 235, wherein compositions for each decomposition in M 230 are stored. Finally, the pre-processor 225 uses the composition mapping table MT 235 to create a normalized mapping table (NMT) 240, which is used to resolve ambiguous compositions. When characters can be validly combined in more than one sequence, the multiple compositions are said to be "ambiguous". To create the NMT, one of the group of valid compositions is defined as the "normalized" composition, and the other valid compositions are mapped to it. In the illustrative embodiment, the mapping tables 230, 235, 240 are created initially and stored in memory for subsequent use by requesting entities, e.g. an application 260 or the operating system. After the mapping tables have been created, the runtime processor 245, accesses the mapping tables 230, 235, 240 when a requesting entity requires a decomposition or composition of Unicode characters. Buffer 250 serves as a temporary storage place for the decomposition or composition data during operation of the runtime processor 245.

Figure 3A:
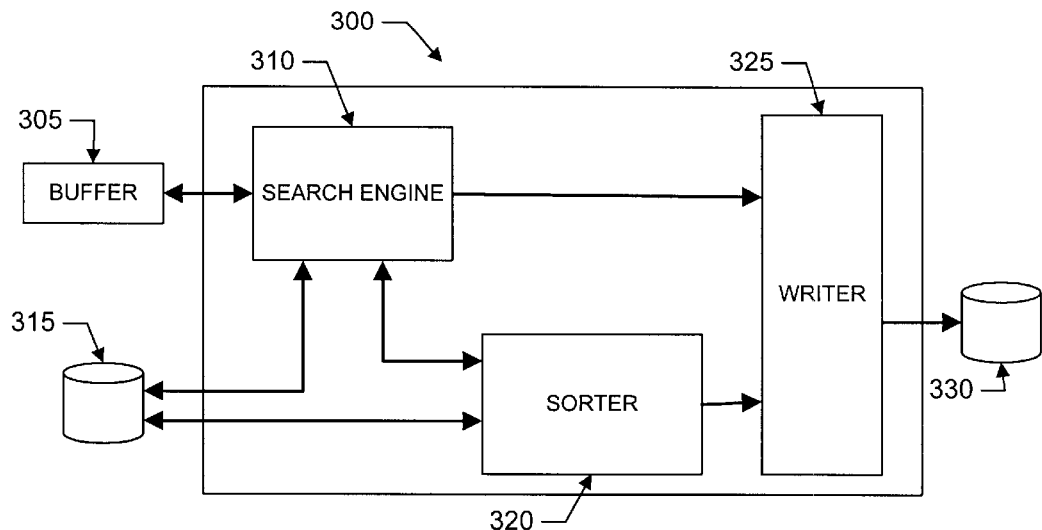
FIGS. 3A and 3B are conceptual block diagrams of a pre-processor of the decomposition and composition modes, respectively in accordance with the present invention.

FIG. 3A illustrates the functional elements of the pre-processor 300 when operating in the decomposition mode to create the decomposition mapping table M 330, also denoted as 230 in FIG. 2.

Figure 4:
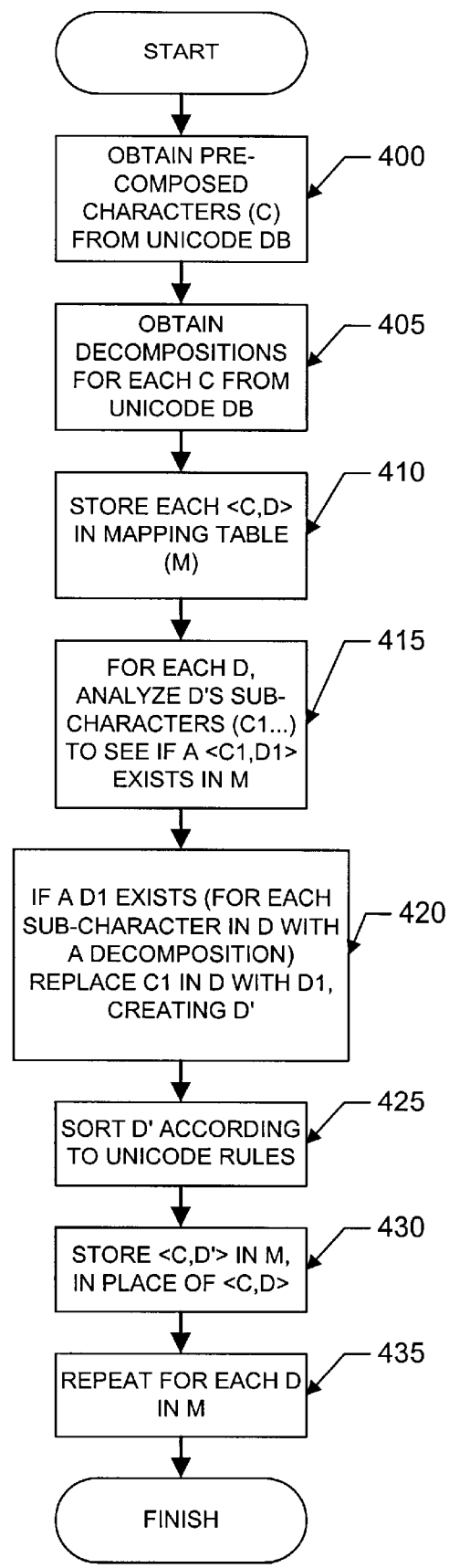
FIG. 4 is a flow diagram illustrating the method for creating a decomposition mapping table in accordance with the present invention.

The actual process of creating the decomposition mapping table M is depicted in the process flowchart of FIG. 4. Creation of mapping table 330 begins when a search engine 310 within the pre-processor 300 iterates through the Unicode DB 307 and obtains an existing Unicode pre-composed character (C) for decomposition, e.g., C="ü" as illustrated by step 400 of FIG. 4. Once found, the character C is stored by the search engine 310 in buffer 305, also referred to as 220 in FIG. 2. Next, the search engine 310 obtains the decomposition for each C, e.g., D="u+", from the Unicode DB, as illustrated by step 405. As mentioned earlier, two characters are decomposed if there is a "+" between them. Together, <C,D>, e.g., <ü, u+>, is referred to as a decomposition "key value pair", which gets written into the mapping table M 330 by writer 325, as illustrated by step 410. Next, the decomposition D of each key value pair in M is analyzed to determine whether it can be decomposed further. The search engine 310 iterates through each sub-character $(C_1, C_2, \ldots)$ of D to determine whether each sub-character $C_1$ has an existing mapping $<C_1,D_1>$ in mapping table M, as illustrated by step 415. If such a mapping does exist for $C_1$, then $C_1$ is replaced with $D_1$ within D, which creates decomposition D' as illustrated by step 420. The search engine 310 goes through this process for each sub-character in D. Once all of the sub-characters are decomposed to the maximum extent possible, D' is sorted by a sorter 320 within the pre-processor 300 in accordance with Unicode combining class rules, also part of the Unicode DB 307 as illustrated by step 425. This sorting creates a normalized decomposition of the original composed character C. As a result, the decomposition key value pair <C,D'>as illustrated by step 430 is created, and is written by writer 325 into the decomposition mapping table M 330 in place of <C,D>. This process continues until the search engine 310 exhausts all pre-composed characters existing in the Unicode DB, as illustrated by step 435. In the illustrative embodiment, the decomposition mapping table 330 is created once and then maintained in memory for subsequent use by the runtime processor 240 of FIG. 2. With the decomposition mapping table M 330 created, an application, for example, may request that a source CCS string be decomposed.

Figure 5:
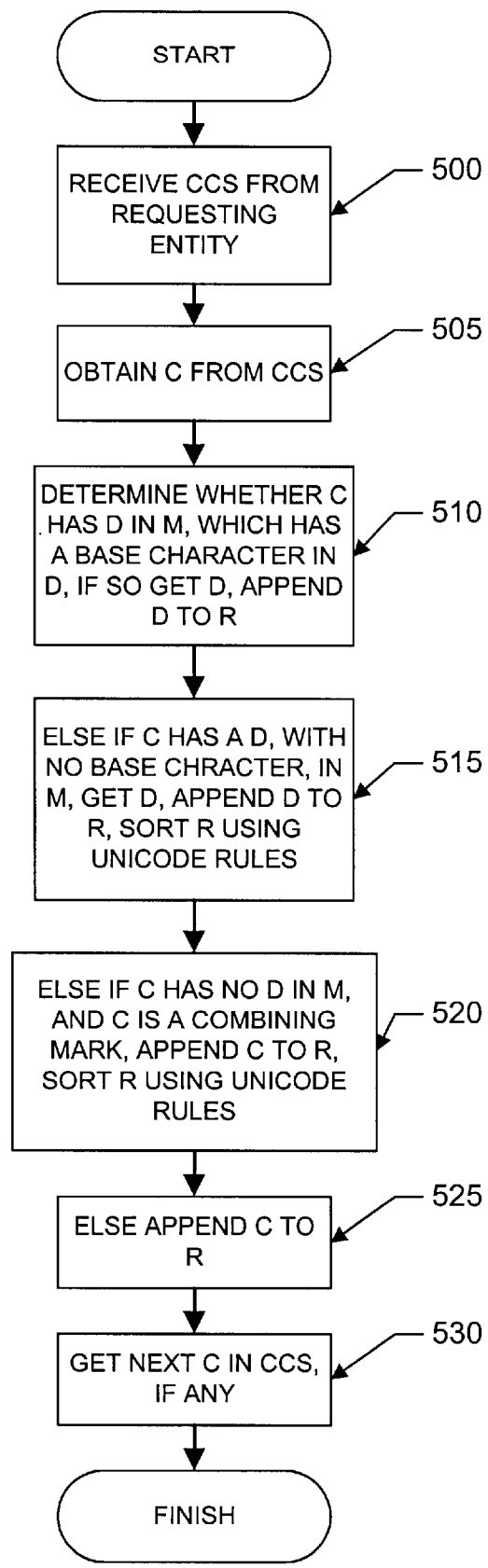
FIG. 5 is a flow diagram illustrating a method for decomposing a source combined character sequence string in accordance with the present invention.

FIG. 5 depicts the process by which the runtime processor 245 accomplishes the decomposition of the source CCS string. During the decomposition process, the runtime processor 245 builds a "result string", R. The result string R serves as a temporary storage place in buffer 250 for the decomposition data during the decomposition process. If a character C within the source string has a decomposition D in mapping table M 330, and the first character in D is a base character, e.g., u, then D is appended to the result string R, rather than inserting the character C itself into the result string as illustrated by steps 500–510. However, if C has a mapping D in mapping table M 330, but the first character is not a base character, then each character within the decomposition D is appended to the result string and the result string is sorted using the Unicode combining class rules, as illustrated in step 515. However, if there is no mapping in mapping table M 330 for C, and C is a combining mark, then C is appended to the result string R and the result string is then sorted and ordered based on the Unicode combining class rules as illustrated in step 520. If C does not fit into any of the previous cases then, by default, C does not have a decomposition D and is not a combining mark, then C is simply appended to the result string R, as illustrated in step 525. If there is another C in the CCS string, the same procedural steps 510–525 are executed, as illustrated by step 530. Because the result string is ordered in accordance with the Unicode combining class rules as it is being created, the final result string is a normalized fully decomposed version of the original source CCS string R. Once the decomposition is concluded, the resulting decomposition is returned by the runtime processor 245 to the application which requested it and the memory associated with the result string is cleared.

Figure 3B:
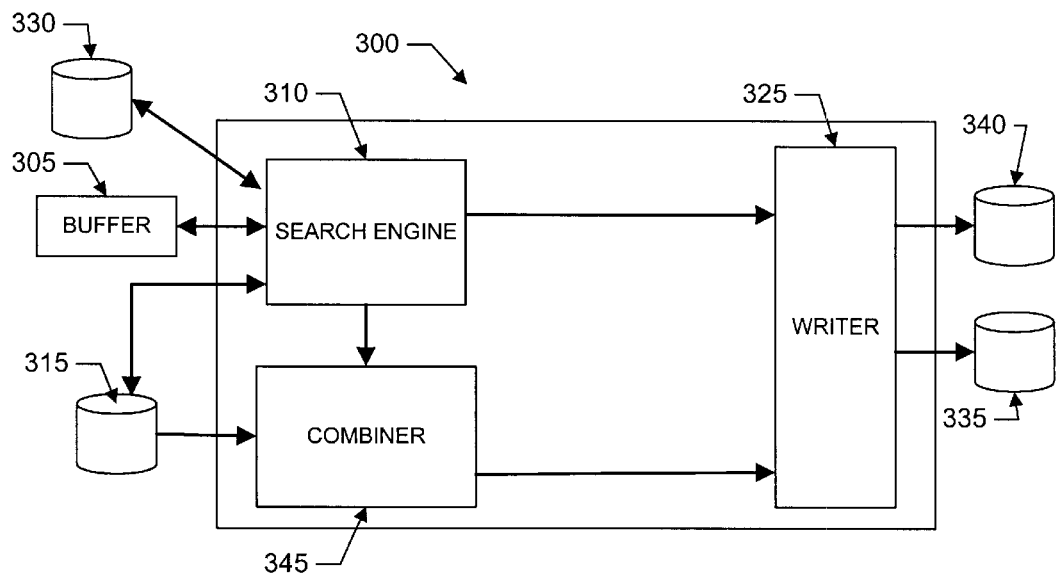

FIG. 3B depicts the pre-processor 300 operating in the composition mode to create the composition mapping table (MT) 335 and composition normalized mapping table (NMT) 340.

Figure 6:
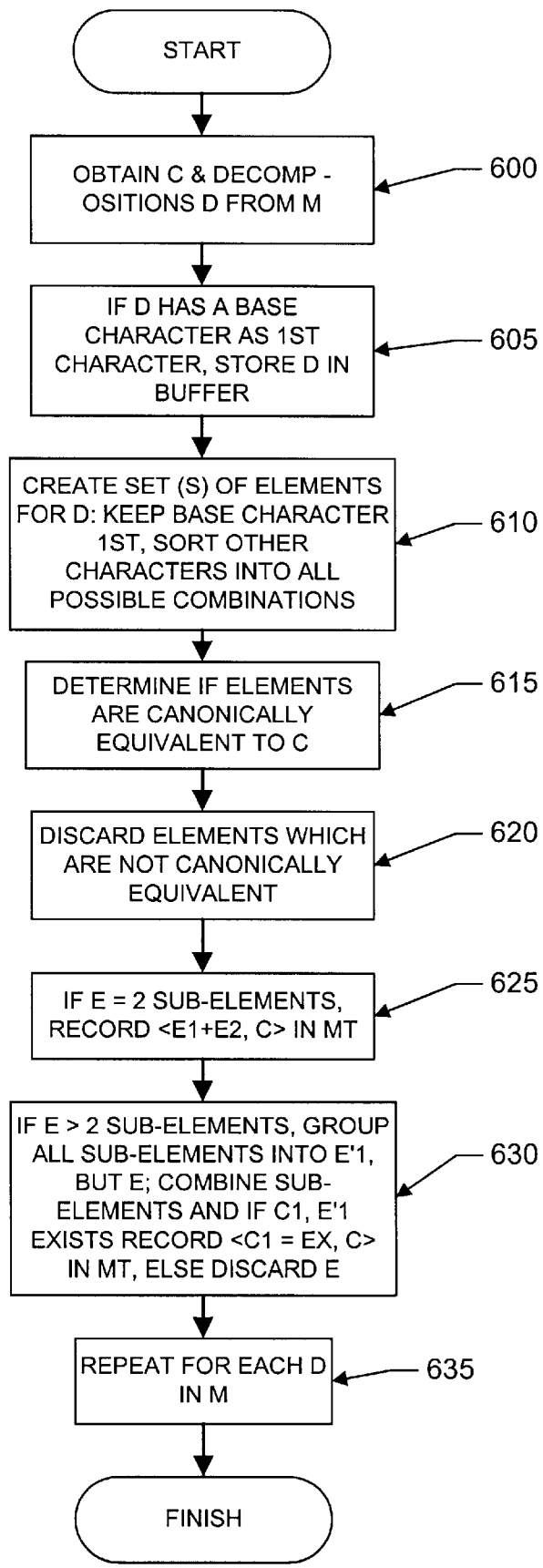
FIG. 6 is a flow diagram illustrating a method for creating a composition mapping table in accordance with the present invention.

The process flowchart of FIG. 6 describes the process for creating the mapping table MT 335. The process begins when search engine 310 iterates through each Unicode character C in the decomposition mapping table M 330, as illustrated by step 600. If the decomposition D associated with C, as part of the decomposition key value pair, has a base character as its first character, the search engine 310 obtains D and stores it in buffer 305, as illustrated in step 605. As an example, for C=A-tilde-acute-dot_below.

the following decomposition may be obtained:

D=A+tilde+acute+dot_below.

Keeping the base character as the first character, a combiner 345 sorts the remaining characters within the decomposition into all possible combinations. This process, illustrated in step 610, produces a set (S) of all possible combinations of decompositions which could be associated with C, wherein each combination within the set is referred to as an "element" (E), as follows: set S=

E1=A+tilde+acute+dot_below;

E2=A+tilde+dot_below+acute;

E3=A+acute+tilde+dot_below;

E4=A+acute+dot_below+tilde;

E5=A+dot below+tilde+acute;

E6=A+dot below+acute+tilde.

The pre-processor 300 uses the Unicode combining class rules 307 to determine whether each element E in set S is canonically equivalent to C, as illustrated in step 615, and discards those elements which are not as illustrated in step 620. In this example, the following elements are canonically equivalent to C:

E1=A+tilde+acute+dot_below

E2=A+tilde+dot below+acute

E5=A+dot_below+tilde+acute

Since tilde and acute cannot be reversed and still remain canonically equivalent, those elements which reorder those characters with respect to C are discarded. The pre-processor continues operating on the remaining elements, e.g., E1, E2, and E5. If a remaining element includes only two sub-elements or characters, a composition "key value pair", i.e., <E, C> is written to the composition mapping table MT, as illustrated in step 625.

In the illustrative embodiment, the composition key value pair includes the original character C and exactly two sub-elements, wherein $E=E_1+E_2$. If the element E is comprised of more than two sub-elements, where $E=E_1+E_2+E_3$, as in the example, all of the sub-elements are grouped into element $E'_1$, with the exception of the right-most sub-element, $E_x$. Therefore, in our example, the following elements result:

for E1:$E'_1$=A+tilde+acute;

for E2:$E'_1$=A+tilde+dot_below;

for E5:$E'_1$=A+dot_below+tilde.

The search engine 310 determines whether a character $C_1$ exists in mapping table M which is a composition that is equivalent to each sequence of sub-elements denoted by $E'_1$. If a $C_1$ does exist in M 330, then the group of sub-elements represented by $E'_1$ is replaced with $C_1$ to create element $E=C_1+E_x$. In our example, the following $C_1$s result:

for E1:$C_1$=A-tilde-acute;

for E2:$C_1$=A-tilde-dot_below;

for E5:$C_1$=A-dot_below-tilde.

Accordingly, a key value pair of <$C_1+E_x$, C> results, and is written into mapping table MT 335. Referring again to the example, where C=A-tilde-acute-dot_below, the following key value pairs result, in the form of <$E_1+E_2$, C>:

for E1:<$C_1$+dot_below, A-tilde-acute-dotbelow>;

for E2:<$C_1$+acute, A-tilde-acute-dot_below>;

for E5:<$C_1$+acute, A-tilde-acute-dot_below>.

If a $C_1$ does not exist in M for $E'_1$, then that element E is discarded by search engine 310. Because sub-elements within an element E may have the same combining class values, they may be combined in different orders and still be canonically equivalent. Consequently, for each C, there may be multiple valid E's, thus multiple composition key value pairs for the same C within MT are possible, as demonstrated by the example. The above-described process is illustrated generally as step 630 and is a repeated for each decomposition D in decomposition mapping table M, as illustrated in step 635.

Referring to FIG. 7, a simplified exemplary composition mapping table MT in accordance with the illustrative embodiment is shown. As can be seen, given a decomposed Unicode character sequence, under the column labelled "$E_1+E_2$", a composition, under the column labelled "C" can be obtained by the runtime processor 245.

As mentioned, the Unicode Standard defines a format for a normalized fully decomposed string, but there is yet no such format for a normalized fully composed character string. For example, the source decomposed character string of "D+dot_above+dot_below" can be correctly represented as either of the maximally pre-composed strings "D-dot_below+dot_above" or "D-dot_above+dot_below", wherein the "-" between characters represents that the characters are composed and can be represented with a single Unicode value. As a result, the composition of "D+dot_above+dot_below" is ambiguous. Without a clear rule by which to compose these ambiguous compositions, its is difficult to create a mapping table, and system, which produces consistent results. Therefore, a character sequence is chosen among the valid sequences as the "normalized form" to facilitate creation of a composition normalized mapping table NMT 340, thus consistent composition results can be provided to the runtime processor 245. During compositions, the NMT 340 augments the composition mapping table MT 335 in the situation where the runtime processor 245 encounters an ambiguous composition. In the illustrative embodiment, the format chosen as the normalized form is one which corresponds most closely to the ordering of the fully normalized decomposed string, in accordance with the Unicode rules. Regarding the example above, the format which would appear in the mapping table NMT 335 would be "D-dot_below+dot_above", because that form most closely corresponds the normalized decomposed form of "D+dot_below+dot_above".

Figure 8:
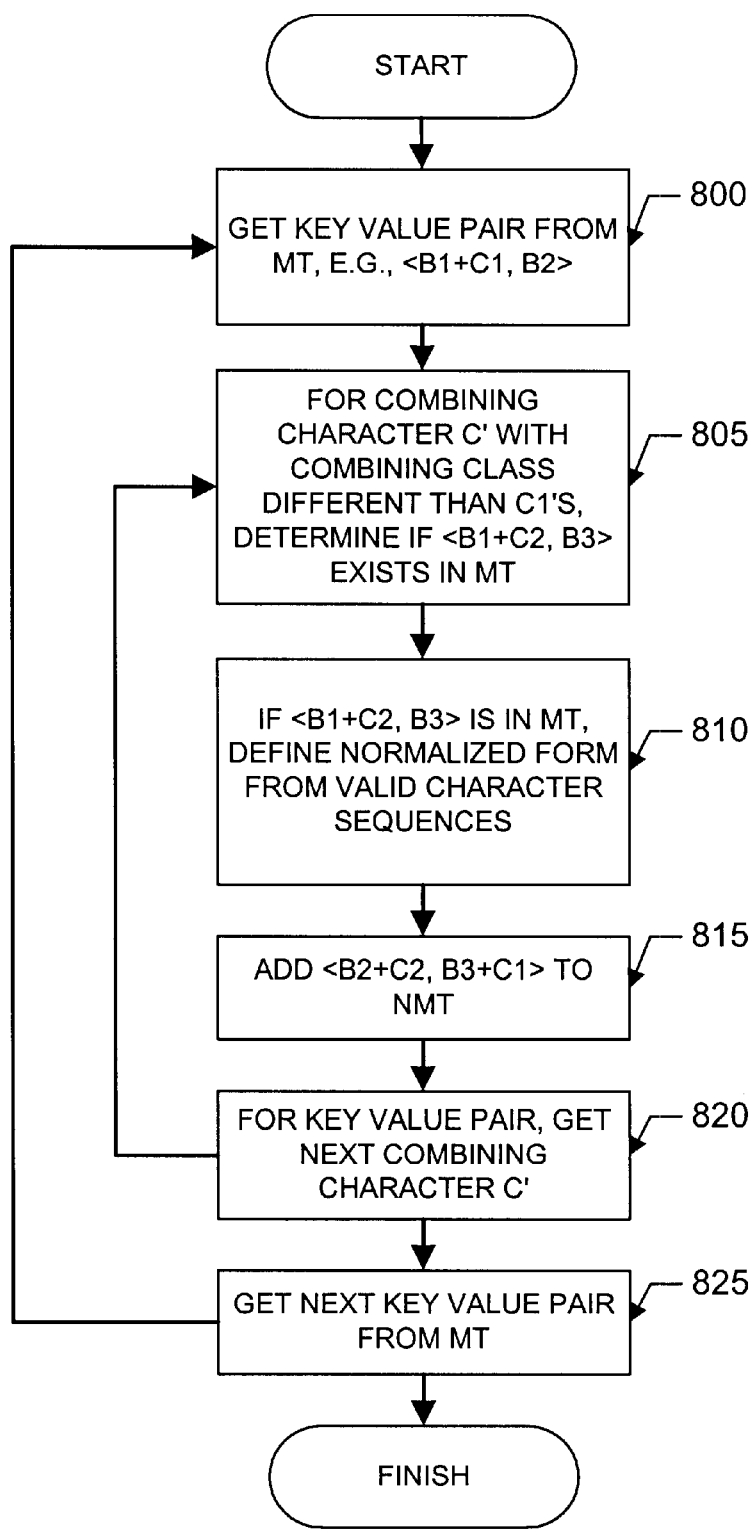
FIG. 8 is a flow diagram of the method for creating the composition normalized mapping table.

The pre-processor 300 of FIG. 3B is used to create the normalized mapping table NMT 340 from mapping table MT 335, as shown in the process flowchart of FIG. 8. Generally, the pre-processor 300 creates the NMT 340 by determining whether or not there are ambiguous compositions in the MT 335. Like decomposition mapping table M 330 and composition mapping table MT 335, the NMT 340 is created once and then made available to the runtime processor 245 for subsequent compositions, in the illustrative embodiment. Like the example above, an ambiguous composition typically involves at least three characters: a base character B1, e.g., D, a combining character C1, e.g., dot_above, and another combining character C2, e.g., dot_below. Wherein, ambiguous compositions for this collection of characters include B1–C1+C2 and B1–C2+C1. Using the symbology of mapping table MT 335, and continuing the prior example:

<$E_1+E_2$, $C_1$>=<B1+C1, B2>=<D+dot_above, D-dot_above>

To create NMT 340, the search engine 310 of the pre-processor 300 iterates through each composition key value pair in MT 330, as illustrated in step 800, e.g.,<B1+C1, B2, and analyzes it against each combining mark C' which does not have the same combining class value as C1, e.g., C2=dot_below, to determine whether an ambiguous composition can exist. Specifically, the search engine 310 searches MT to see whether a key value pair <B1+C2, B3> exists, as illustrated in step 805 such that:

<$E_1+E_3$, $C_2$>=<B1+C2, B3>=<D+dot_below, D-dot_below>

If <B1+C2, B3> does exist, than an ambiguous composition involving B1, C1, and C2 also exists. Accordingly, search engine 310 defines either B1–C1+C2 or B1–C2+C1 as the normalized form of the composition of the three characters, in accordance with the Unicode normalized decomposition rules in DB 307, as illustrated in step 810. For illustrative purposes, define B1–C2+C1 as the normalized form, which is equivalent to B3+C1. The combiner 345 then constructs the ambiguous composition pair in this form:

<B2+C2, B3+C1>=<D-dot_above+dot_below, D-dot_below+dot_above>

Next, the combiner 345 passes the pair to the writer 330, which writes the pair to the NMT 340, as illustrated in step 815. In a similar manner, the next combining character C' for the key value pair is processed, as illustrated by step 820, using the previously-described process steps 805–815. Thereafter, the next key value pair is retrieved from NMT 340, as illustrated by process step 825, and the process is described by steps it 805–820, performed, as appropriate, for such key value pair. Therefore, the NMT 340 provides a mapping of B1–C1+C2 to B1–C2+C1, so that if the runtime processor 245 is given the characters B1, C1, and C2 in any order, the normalized composition gets returned to the runtime processor 245.

With the composition mapping tables MT 335 and NMT 340 created, an application, for example, may request a composition of a source decomposed character string, wherein the source decomposed character string is comprised of a plurality of characters, Cs.

Figure 9:
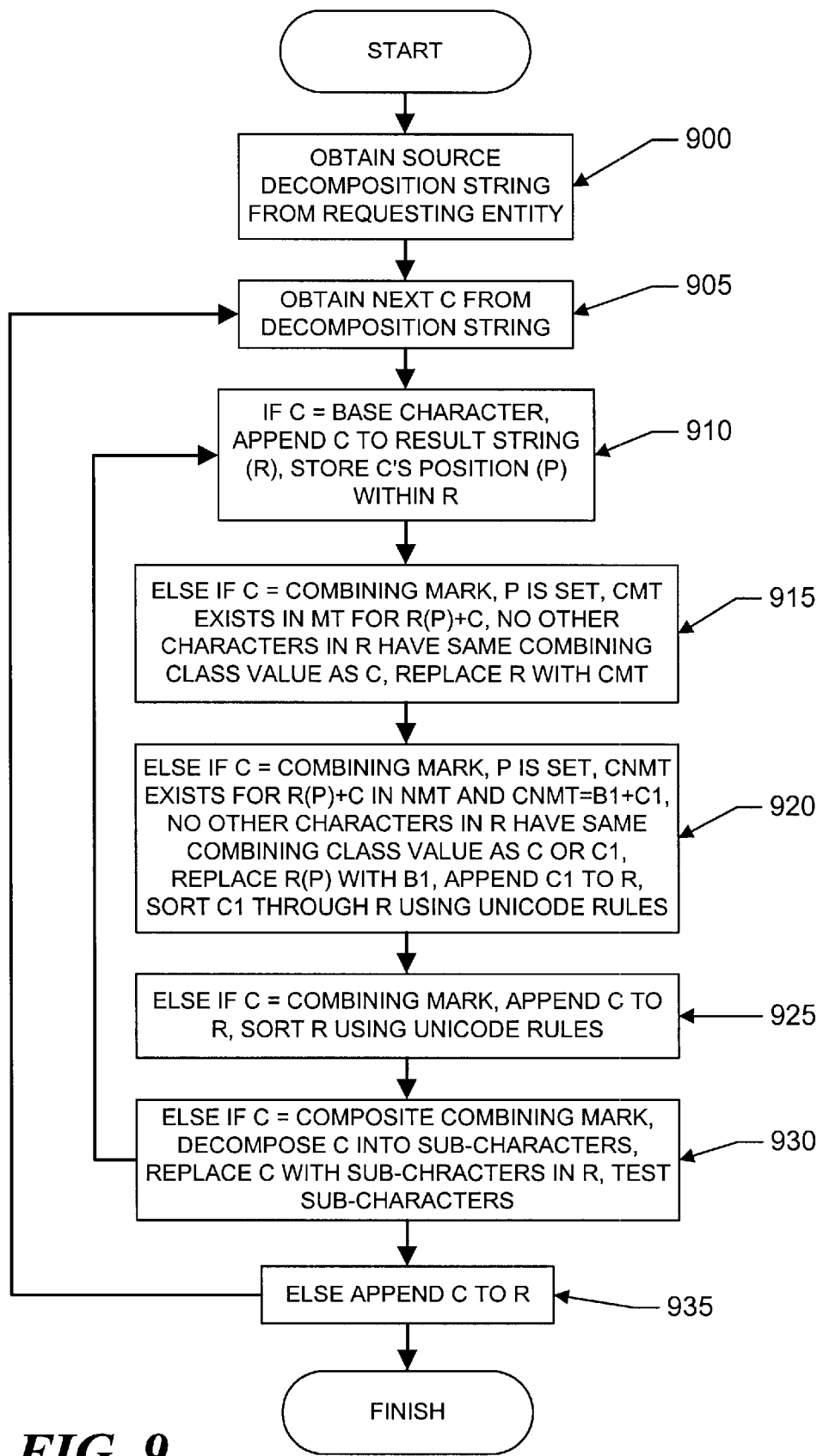
FIG. 9 is a flow diagram of the method for producing a composition from a decomposed character string of the illustrative embodiment.

The flow chart of FIG. 9 describes the composition process, which is controlled by the runtime processor 245 in the illustrative embodiment. Once a request for a composition is made as illustrated in step 900, the runtime processor 245 iterates through each character C in the decomposed string as illustrated by step 905, to ultimately build a "result string" (R). As the result string is being constructed, the runtime processor 245 uses data from mapping table MT 335 and NMT 340 to determine whether Cs within the result string can be combined. If so, the runtime processor 245 replaces those Cs within the source decomposed character string with the valid composition from MT 335 or NMT 340.

Specifically, if C is a base character, it is appended to the result string R and its position (p) within the result string is stored in buffer 250, wherein the base character C can then be denoted by R(p), as illustrated in step 910. The runtime processor 245 then continues to iterate through each remaining character in the decomposition.

If C is a combining mark, rather than a base character, C is treated in one of three ways, as described below.

1) If p is already set—meaning R(p) exists, then the runtime processor 245 determines whether there exists a composition for R(p)+C in MT, denoted as $C_{MT}$. Assuming that $C_{MT}$ does exist in MT 335 for R(p)+C, and if no other character within the result string after R(p) has the same combining class value as C, then the runtime processor 245 replaces R(p)+C with $C_{MT}$ in the result string, as illustrated in step 915.

2) If p is set and R(p)+C has a mapping $C_{NMT}$=B1+C1 in NMT 340, then the runtime processor 245 scans any remaining characters after R(p) and if no remaining characters after R(p) have a combining class value that is the same as C or C1, then R(p) is replaced in result string R with B1, and C1 is also appended to the result string R. C1 is then bubble sorted through R in accordance with the Unicode combining class rules in DB 307, as illustrated in step 920. The runtime processor 245 then continues to iterate through any remaining characters in the source decomposed string.

3) If there is no $C_{MT}$ or $C_{NMT}$ for R(p)+C, then the combining mark C is appended to the result string R, and R is sorted using the Unicode combining class rules in DB 307, again by the runtime processor 245, as illustrated in step 925.

If C is a composite combining mark, e.g., $C_1$-$C_2$-$C_3$, then C is decomposed into its sub-characters, e.g., $C_1$+$C_2$+$C_3$, wherein the search engine 310 obtains the decomposition information from the decomposition mapping table 330. The decomposition sub-characters replace C in the original source decomposition string, and each sub-character is then analyzed in the same manner as is used for the original source decomposition string characters described above, as illustrated by step 910–930.

If C does not fit into any of the above situations, then C is appended to the result string R and the runtime processor 245 continues iterating through the remaining Cs in the source decomposed character string, as illustrated in step 905–935.

As this process is repeated, Cs are combined in accordance with the entries in the mapping tables MT 330 and NMT 340 to produce a CCS which is composed, to the maximum extent possible, and is still the canonical equivalent of the original source decomposed character string. The runtime processor 245 returns the CCS to the application, clears the result string, and unsets p.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

While the invention has been shown and described with reference to an illustrative embodiment thereof, it will be understood by those skilled in the art that various changes in form and detail may be made herein without departing from the spirit and scope of the invention as defined by the appended claims. For example, as used in this disclosure, the term "Unicode" is intended to mean the Unicode Standard Version 2.0 and subsequent versions and revisions thereto, as well as other current and future character code sets which have the abilities to represent code elements and/or composed character sequences.

What is claimed is:

1. In a computer system capable of storing and processing data and having access to a Unicode database comprising predefined Unicode characters and predefined Unicode rules for decomposition of Unicode combined character sequences, a method for generating a canonical equivalent Unicode composition or a canonical equivalent Unicode decomposition from a Unicode source combined character sequence string upon request, comprising:

A) creating a mapping table database from a plurality of Unicode source combined character sequence strings, including:

A.1) creating a canonical equivalent Unicode decomposition which contains no precomposed Unicode characters from each of the source combined character sequence strings;

A.2) creating a set of canonical equivalent Unicode compositions which each comprise the maximum amount of composed Unicode characters possible in accordance with the Unicode database and rules from each of the Unicode source combined character sequence strings; and A.3) populating the mapping table database with each of the plurality of Unicode source combined character sequence strings and canonical equivalent Unicode decompositions and canonical equivalent Unicode compositions derived therefrom and data defining an association between each of the plurality of Unicode source combined character sequence strings and the canonical equivalent Unicode decompositions and the canonical equivalent Unicode compositions derived therefrom;

B) receiving, from a requesting entity, a request for one of a canonical equivalent Unicode composition and a canonical equivalent Unicode decomposition, given one of the Unicode source combined character sequence strings as part of the request;

C) retrieving from the mapping table database one of the requested canonical equivalent Unicode composition and canonical equivalent Unicode decomposition based on the Unicode source combined character sequence string provided with the request; and D) providing one of the located and canonical equivalent Unicode composition and canonical equivalent Unicode decomposition to the requesting entity.

2. The apparatus of claim 1, wherein (A) further comprises:

A.4) repeating steps A.1 and A.2 until no other source combined character sequence strings exist.

3. The method of claim 1, wherein A.2) comprises:

A.2.1) getting the Unicode source combined character sequence string comprising a set of characters which include any combination of decomposed characters and combined character sequences;

A.2.2) decomposing the Unicode source combined character sequence string into its Unicode decomposition characters, such that none of the decomposition characters is a combined character sequence;

A.2.3) forming a set of intermediate result combined character sequences comprised of an comprising unique combinations of decomposition characters, wherein the set of intermediate result combined character sequences comprises all possible combinations of the decomposition characters; and A.2.4) filtering out from the set of intermediate result combined character sequences a set of all non-canonical equivalent combined character sequences in accordance with the Unicode rules.

4. The method of claim 3 further comprises:

A.2.5) discarding any non-canonical equivalent intermediate result combined character sequences; and A.2.6) composing the intermediate result canonical equivalent combined character sequences by combining decomposition characters to the maximum extent possible in accordance with the Unicode rules to create resulting canonical equivalent Unicode compositions; and A.2.7) storing, in a mapping table database, the Unicode source combined character sequence, each of the resulting canonical equivalent Unicode compositions, and data defining an association between the Unicode source combined character sequence and each resulting canonical equivalent Unicode composition.

* * * * *